United States Patent
Jeknavorian et al.

(10) Patent No.: US 8,070,875 B2
(45) Date of Patent: Dec. 6, 2011

(54) SLUMP RETENTION IN CEMENTITIOUS COMPOSITIONS

(75) Inventors: Ara A. Jeknavorian, Chelmsford, MA (US); Hideo Koyata, Atsugi (JP); Darrick B. McGuire, Arlington, MA (US); Ivana Jovanovic, Boston, MA (US)

(73) Assignee: W.R. Grace & Co.-Conn., Columbia, MD (US)

( * ) Notice: Subject to any disclaimer, the term of this patent is extended or adjusted under 35 U.S.C. 154(b) by 809 days.

(21) Appl. No.: 12/089,944

(22) PCT Filed: Oct. 12, 2006

(86) PCT No.: PCT/US2006/039991
§ 371 (c)(1),
(2), (4) Date: Apr. 11, 2008

(87) PCT Pub. No.: WO2007/047407
PCT Pub. Date: Apr. 26, 2007

(65) Prior Publication Data
US 2008/0295741 A1   Dec. 4, 2008

(51) Int. Cl.
*C04B 24/00* (2006.01)
*C04B 24/12* (2006.01)
*C04B 24/16* (2006.01)

(52) U.S. Cl. ........ 106/696; 106/724; 106/726; 106/727; 106/728; 106/823; 524/5

(58) Field of Classification Search ................... 106/696, 106/724, 726, 727, 728, 823; 524/5
See application file for complete search history.

(56) References Cited

U.S. PATENT DOCUMENTS

| | | | |
|---|---|---|---|
| 6,139,623 | A | 10/2000 | Darwin et al. |
| 6,527,850 | B2 | 3/2003 | Schwartz et al. |
| 2004/0211342 | A1 | 10/2004 | Sprouts et al. |
| 2004/0225093 | A1 | 11/2004 | Tomita et al. |

FOREIGN PATENT DOCUMENTS

| | | |
|---|---|---|
| DE | 4034217 | 5/1991 |
| JP | 60161365 | 8/1985 |
| JP | 61183157 | 8/1986 |
| JP | 6206748 | 7/1994 |
| JP | 2000185951 | 7/2000 |
| JP | 2000185958 | 7/2000 |
| JP | 2003313069 | 11/2003 |
| JP | 2004196624 | 7/2004 |

OTHER PUBLICATIONS

Form PCT/ISA/210 and 237, Search Report and Written Opinion, PCT/US06/039991 dated Jun. 29, 2007, 7 pages.
Form PCT/IPEA/409, International Preliminary Report on Patentability, PCT/US06/039991 dated Dec. 17, 2007, 3 pages.

*Primary Examiner* — Paul Marcantoni
(74) *Attorney, Agent, or Firm* — Craig K. Leon; Stephan P. Williams

(57) ABSTRACT

The present invention relates to dispersants such as superplasticizers for hydratable cementitious compositions, and more particularly to methods for achieving variable degrees of longer slump life in concrete and mortar without loss of stability. This is achieved by using two admixture systems. The first admixture composition has multi-components for achieving initial-slump-enhancement, later-slump-retention, and limiting initial slump. The second admixture composition has the later-slump-enhancing component. Alternatively, conventional water reducers or superplasticizers can be employed initially, followed by the later-slump-enhancing admixture composition.

8 Claims, 6 Drawing Sheets

Slump Retention, Time, T, minutes where slump at 80 minutes is 80% of initial slump, $S_{idn}$

SLUMP RETENTION IN CEMENTITIOUS COMPOSITIONS

FIELD OF THE INVENTION

The present invention relates to dispersants such as superplasticizers for hydratable cementitious compositions, and more particularly to methods for achieving variable degrees of longer slump life in concrete and mortar without loss of stability. This is achieved by using two admixture systems. The first admixture composition has multi-components for achieving initial-slump-enhancement, later-slump-retention, and limiting initial slump. The second admixture composition has the later-slump-enhancing component. Alternatively, conventional water reducers or superplasticizers can be employed initially, followed by the later-slump-enhancing admixture composition.

BACKGROUND OF THE INVENTION

It is common practice to add cement dispersants such as plasticizers and superplasticizers to concrete and mortars to render such more fluid and/or to increase strength by reducing the amount of mix water required to obtain a desired fluidity. It is well-established, however, that when the dosage rate of a dispersing agent is progressively increased, an increase in the initial workability or yield stress (or "slump") of the cementitious mixture is usually obtained. Furthermore, based on the particular type of dispersant employed, the workability retention of the mixture is extended for some period of time.

The workability of the concrete or mortar mixture is referred to by using the term "slump," which is a property that can be quantitatively measured by the extent to which fresh concrete or mortar flows when demolded or removed from an inverted cone on a flat surface.

Normally, increasing the dosage of certain dispersing agents or superplasticizer to an excessive amount to achieve longer slump life causes the initial workability to increase such that the mixture is no longer stable. This loss of stability is manifested in terms of severe segregation of sand and/or stone aggregate constituents from the wet cement paste in the concrete or mortar. Furthermore, such excessive dosages of the dispersing agent can cause undesirable extended setting times of the treated cementitious mixtures.

Thus, an objective of the present invention is to provide methods and compositions which allow a concrete producer to extend the slump life of the concrete by varying the dosage of the dispersant formulation in the concrete mixture, whereby the initial workability of the mixture, once a certain desired slump range has been achieved, changes to a significantly far less degree versus the accompanying slump retention, thus avoiding the problem of segregation of the concrete components.

Another objective of the present invention is to provide the ability to add variable amounts of a dispersing agent or superplasticizer that is operative to increase workability or slump retention of the concrete mixture at later times (e.g., for the period of 30 minutes to three hours after cement and aggregate(s) are mixed together to form the hydratable concrete or cementitious mixtures).

SUMMARY OF THE INVENTION

The present invention pertains to methods and compositions for providing extended slump life either by use of a variable dose superplasticizer formulation or a formulation that solely acts to maintain slump for a period of time after the start of initial mixing of hydratable cementitious compositions such as concrete and mortar. The inventive variable dose superplasticizer provides an immediate increase in slump, or initial workability, an upper limit on the degree of the initial workability, as well as extended slump life, while avoiding problems of segregation of mixture components and extended set time. The slump maintaining additive, added during the initial mixing of the cementitious composition, operates to maintain any pre-established level of workability beginning at about 30 minutes and extending for up to about three hours after addition.

The present invention also increases workability or slump retention for periods of time without incurring excessive set retardation or decreasing strength in the concrete or mortar composition.

In a first embodiment of the invention, a variable dose, variable slump composition is prepared from selected components which allows the concrete or masonry producer to extend the slump life of the concrete or masonry by simply varying the dosage of the composition without significantly changing the initial workability of the concrete or masonry, thus avoiding the problem of segregation of the concrete or masonry components. The variable dose, variable slump composition contains three functional materials:

(a) an initial slump increasing agent;
(b) an agent that moderates or controls the response of the initial slump increasing agent when both are added to cementitious mixes;
(c) a long term slump retention agent.

Thus, the combination of the initial slump increasing agent and the slump moderating agent are so selected as to allow the concrete to achieve a certain level of workability when the dosage is increased, but then no slump increase is obtained when the dosage of the formulation increases. Moreover, as the dosage of the formulation increases, the slump retention increases in a predictable manner.

In a second embodiment of the invention, an agent that has little or no effect on initial slump or workability is added in varying amounts to a cementitious mixture to maintain, "boost" or increase the workability or slump retention of the mixture for periods of time, dependent on the added dosage of the agent, without adversely affecting setting time or causing segregation.

DETAILED DESCRIPTION OF THE INVENTION

Figure 1:
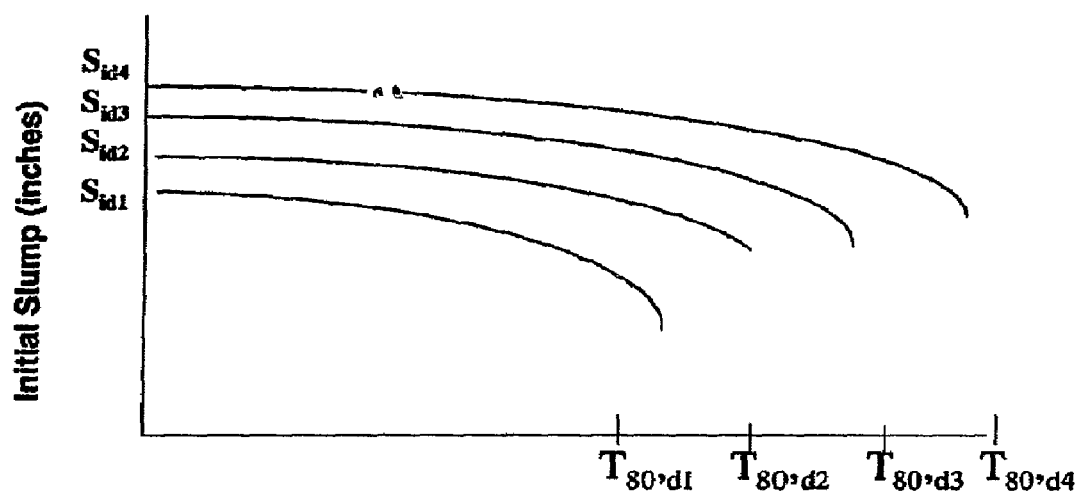
FIG. 1 is a graphic illustration of the slump activity in a concrete mix over time of exemplary Variable Dose, Variable Slump Superplasticizers ("VDVSS") of the present invention.

Exemplary methods of the invention for achieving relatively predictable slump retention in a hydratable cementitious composition over time, comprise the following admixture systems:

(A) A variable dose, variable slump superplasticer ("VDVSS") admixture composition is introduced to a hydratable cementitious binder before, during, or after water is added to said cement binder to form a hydratable cementitious mixture, said VDVSS composition being operative to achieve an initial slump at a particular dosage rate, $Si_{d1}$, of said hydratable cementitious mixture and maintain at least about 80% of the initial slump for a time, $T_{80,d1}$ (see FIG. 1). When the dosage rate of the VDVSS composition is increased from $d_2$ up to $d_n$, the initial slump, Si associated with dosages $d_1$ up to $d_n$, changes by no more than about three (3) inches (75-mm); however, the $T_{80}$ value can be extended up to three (3) hours without segregation of the mixture components, and with set times extended no longer than x minutes relative to a cementitious mixture without the VDVSS admixture.

(B) A "booster" admixture package to improve or "boost" slump life of a cementitious mix such as "ready-mix" concrete where improved slump life is desired or required due to hot ambient conditions, long haul times, tight slump specifications, etc. Typically the admixture is dosed in the range of from about 2 to about 6 ounces/cement weight depending upon mix design specifics, slump life requirements, and ambient and concrete temperatures.

FIG. 1 illustrates the activity of the Variable Dose, Variable Slump Superplasticizer ("VDVSS") of the present invention. The slump behavior of four different samples having different admixture ranges is shown as a function of time in minutes.

An exemplary VDVSS admixture composition comprises at least three different components, wherein:

(i) a first component, SE, is operative to rapidly increase the slump of said hydratable cementitious mixture said first component comprising a polycarboxylate comb polymer superplasticizer having pendant ionized cement anchoring groups and having pendant non-ionizable dispersing groups, wherein the ratio of said ionized cement anchoring groups is 1:1 to 20:1 with respect to said non-ionizable dispersing groups;

(ii) a second component, SC, operative to moderate the initial slump-increasing effect of said first component said second component being selected from the group consisting of melamine sulfonate formaldehyde condensate; naphthalene sulfonate formaldehyde condensate; lignosulfonate, sulfonate, carbonate, phosphate, formate, nitrite, nitrate, sulfate and gluconate salts; sugars, sugar acid salts, and carbohydrates; and (iii) a third component, SR, operative to retain slump of said hydratable cementitious mixture said third component comprising a polycarboxylate comb polymer superplasticizer having either less initially ionized cement anchoring groups compared to SE, initially-non-ionized cement anchoring groups, which become ionized over time after being mixed into the wet cementitious mixture, and pendant non-ionizable dispersing groups, wherein the ratio of said initially non-ionized cement anchoring groups is 1:1 to 20:1 with respect to said non-ionizable dispersing groups.

The three components, SE, SC, and SR can be present over the following ranges: the SR/SE ratio is from 9/1 to 1/9, and the SC component can range from 5 to 50% of the total of SE+SR. One preferred embodiment of the invented mixture features an SR/SE ratio from 5/1 to 1/5, while SC can range from 10 to 30% of SE+SR. A preferred embodiment comprises a an SR/SE ratio of 2/1 with SC at 20% of SE+SR.

Included among the polycarboxylate comb polymers that can function as SE are Mighty 21 ES from Kao and HW-1B from Nippon Shokubai Co. LTD. Polycarboxylate comb polymers that have the desirable slump retaining properties suitable for use as SR include Mighty 21RS (Kao) and HS from Nippon Shokubai. Sodium gluconate is the preferred slump-controlling component.

Figure 2:
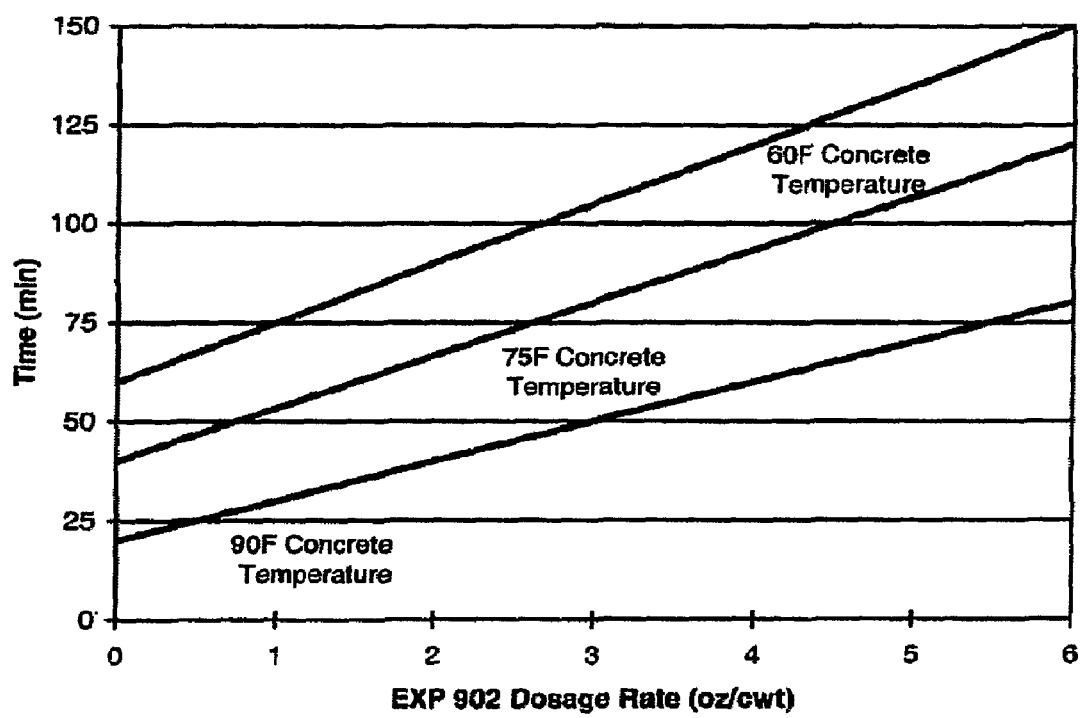
FIG. 2 is a graphic illustration of the activity in concrete mixes of another exemplary embodiment of the invention, wherein a "booster" admixture package is used.

FIG. 2 illustrates the activity of the second embodiment of the present invention, wherein a "booster" admixture package is used.

The invention is further illustrated in the following non-limiting Examples.

Example 1

A VDVSS composition having the composition described below is prepared and added to a concrete mix having the composition set forth below.

Mix Design:

| Cement: | 708 lbs/yd$^3$ Ordinary Portland Cement |
|---|---|
| Water: | 295 lbs/yd$^3$ |
| Stone: | 1800 lbs/yd$^3$ |
| Sand: | 1420 lbs/yd$^3$ |

Admixtures: VDVSS dosed at 7.6, 8.6, and 10.0 oz/cwt

Figure 3:
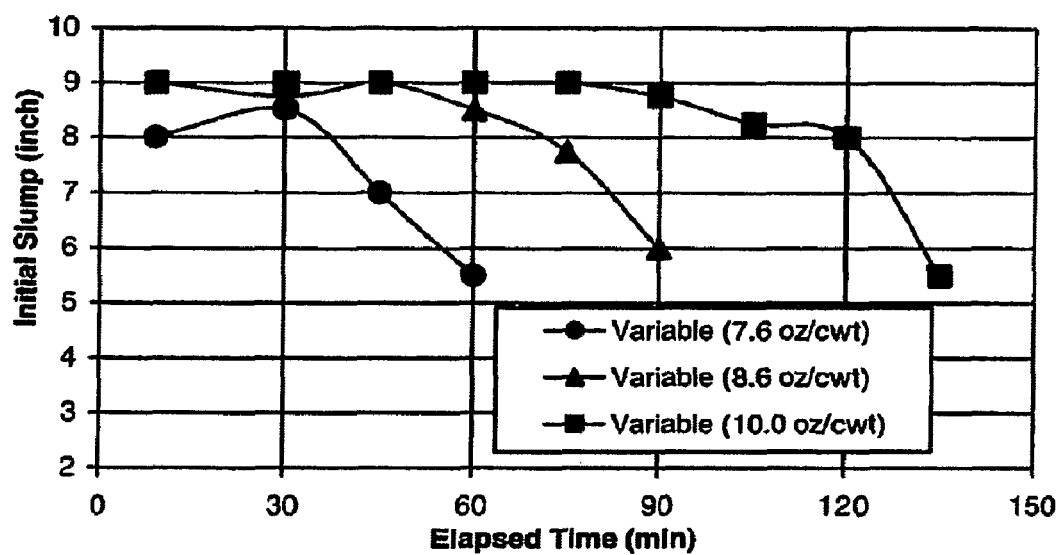
FIG. 3 is a graphic illustration of the effects in concrete mix of a preferred VDVSS of the present invention, wherein three components are used, the first being a rapid slump increasing component, the second being an initial-slump-increasing moderating agent, and the third being a slump retaining component.

FIG. 3 conceptually illustrates the variable dose, variable slump retention performance of a preferred embodiment of the invention, where the three components SE/SR/SC previously described are present at a ratio of 1:2:0.6 by weight. In this embodiment "SE" is a polycarboxlate "comb" type polymer superplasticizer sold by Nippon Shokubai Co. LTD under the tradename "HW-1B PC". It has a polyacrylate or polymethacrylate backbone and pendant polyether groups ("combs"), with possibly pendant sulfonate groups as well. "SR" is also a commercial product of Nippon Shokubai sold under the name "HS1-PC" generally the same as "HW-1B PC", except that that the ratio of the carboxylate anchoring groups in the backbone to pendant groups is lower. "SC" is sodium gluconate.

As shown in FIG. 3, initial slumps can be seen within an inch range. however, the slump retention, in terms of the time before the slump falls below 7 inches, varies from 45 minutes to just over 2 hours.

Example 2

A "booster" admixture package is prepared having the composition described below and is added at two dosages to a concrete mix having the ingredients set forth below. The concrete mix also had previously added to it seven ounces of a 30% aqueous solution of "ADVA™ 170" ASTM C 494 Type F superplasticizer (ADVA™ brand superplasticizers are commercially available from W. R. Grace & Co.-Conn., of Cambridge, Mass., USA). The performance of the two dosages is compared with that of a "control" which is the same concrete mix design with only the ADVA™ brand superplasticizer present.

Mix Design:

| Ordinary Portland Cement: | 708 lbs./cubic yd. |
|---|---|
| Water | 303 lbs./cubic yd.. |
| Stone: | 1800 lbs./cubic yd. |
| Sand | 1398 lbs./cubic yd. |

Booster Admixture:

A 30% aqueous solution of "Mighty 21RS" superplasticizer and a defoamer. "Mighty 21RS" is a commercial product from Kao comprising a polycarboxylate comb polymer superplasticizer having either less or no initially ionized cement anchoring groups compared to SE, which become ionized over time after being mixed into the wet cementitious mixture, and pendant non-ionizable dispersing groups, wherein the ratio of said initially non-ionized cement anchoring groups is 1:1 to 20:1 with respect to said non-ionizable dispersing groups.

Figure 4:
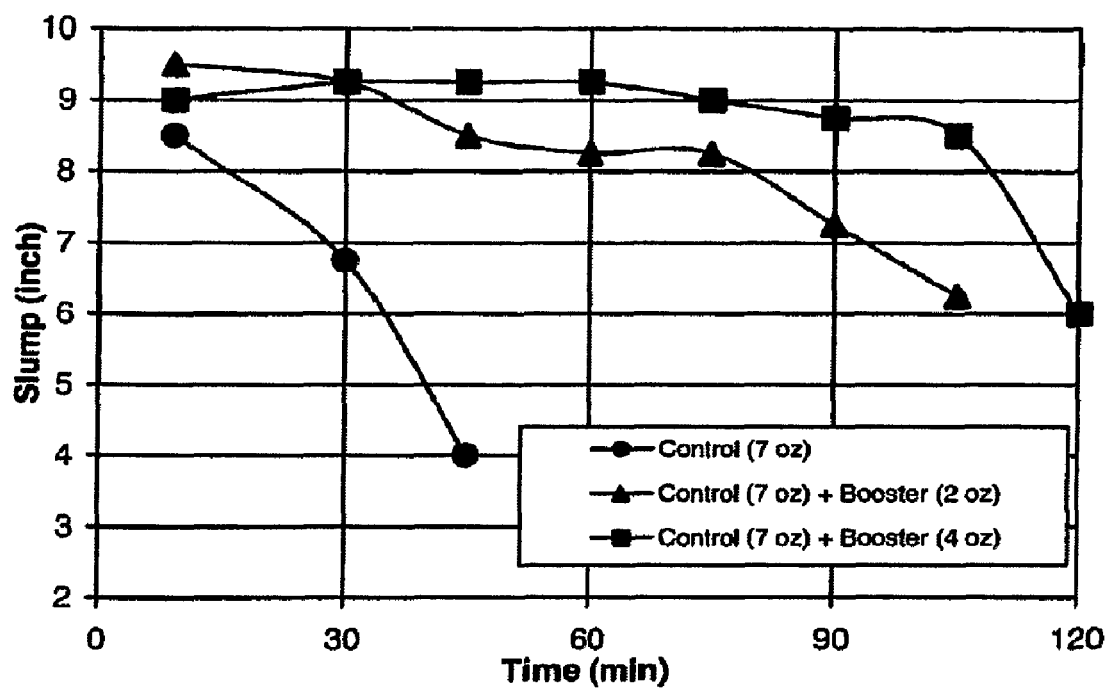
FIG. 4 is a graphic illustration of three different concrete mix samples wherein slump retention is extended by changing the dosage of a booster admixture without having an impact on set time.

FIG. 4 illustrates the performance of the three resulting concretes. It can be seen that changing the dosage of the booster admixture without having any impact on set time can extend the slump retention.

As used herein, "polycarboxylate comb superplasticizers" means those cement dispersing polymers and copolymers having a polycarboxylate backbone and pendant alkylene oxide groups therefrom, such as ethylene oxide, propylene oxide, etc., and mixtures of the same. Polymers of these general types are prepared for example by copolymerizing unsaturated (alkoxy)polyalkylene glycol mono (meth)acrylic acid or ester type monomers with (meth) acrylic acid type monomers such as are described in U.S. Pat. No. 6,139,623, the disclosure of which is hereby incorporated by reference.

The term "cementitious composition" as may be used herein includes pastes (or slurries), mortars, and grouts, such as oil well cementing grouts, shotcrete, and concrete compositions comprising a hydraulic cement binder. The terms "paste", "mortar" and "concrete" are terms of art: pastes are mixtures composed of a hydratable (or hydraulic) cement binder (usually, but not exclusively, Portland cement, Masonry cement, Mortar cement, and/or gypsum, and may also include limestone, hydrated lime, fly ash, granulated blast furnace slag, and silica fume or other materials commonly included in such cements) and water; "mortars" are pastes additionally including fine aggregate (e.g., sand), and "concretes" are mortars additionally including coarse aggregate (e.g., crushed rock or gravel). The cement compositions described in this invention are formed by mixing required amounts of certain materials, e.g., a hydraulic cement, water, and fine and/or coarse aggregate, as may be required for making a particular cementitious composition.

The additive formulations according to the present invention can contain further optional ingredients in addition to those listed above, such as defoaming agents, anti-microbial agents, etc.

In a further exemplary embodiment of the invention, a viscosity-modifying agent ("VCM") is incorporated into the additive formulations in place of, or as part of, the slump-controlling (SC) ingredient previously described. Thus this embodiment would comprise the SE component and the SR component previously described, and as the SC component, or part of the component, the VMA component. When used alone to replace the SC component, the amount of VMA used is from 0.1 to 25% of the total amount of SE and SR component used. The viscosity modifying agent (VMA) is one which when added to any cementitious mixture further minimizes any segregation tendencies of the mixture components that might cause a non-uniform composition throughout the mixture. Exemplary viscosity modifying agents include biopolymers derived from polysaccharides. A preferred example is the microbial polysaccharide identified as S-657 (see U.S. Pat. No. 6,110,271), and also identified as Diutan. S-657 and Diutan are available from CP Kelco Company.

The concentration range of the viscosifying agent can be from 0.1 to 25% by weight of the SE+SR. The preferred range is 2 to 3%. With the incorporation of the viscosity modifying agent to the inventive mixture, addition of the mixture (now including the viscosity modifying agent) to a cementitious mixtures allows not only variable slump response with changes in dosages, but also different degrees of segregation resistance and stability for the mixture components during the initial mixing, continued mixing, transport, placement, and hardening process of the mixture. The following is an example of the inventive admixture using VMA as the SC component. It is shown as "EXP 593."

Example 3

Figure 5:
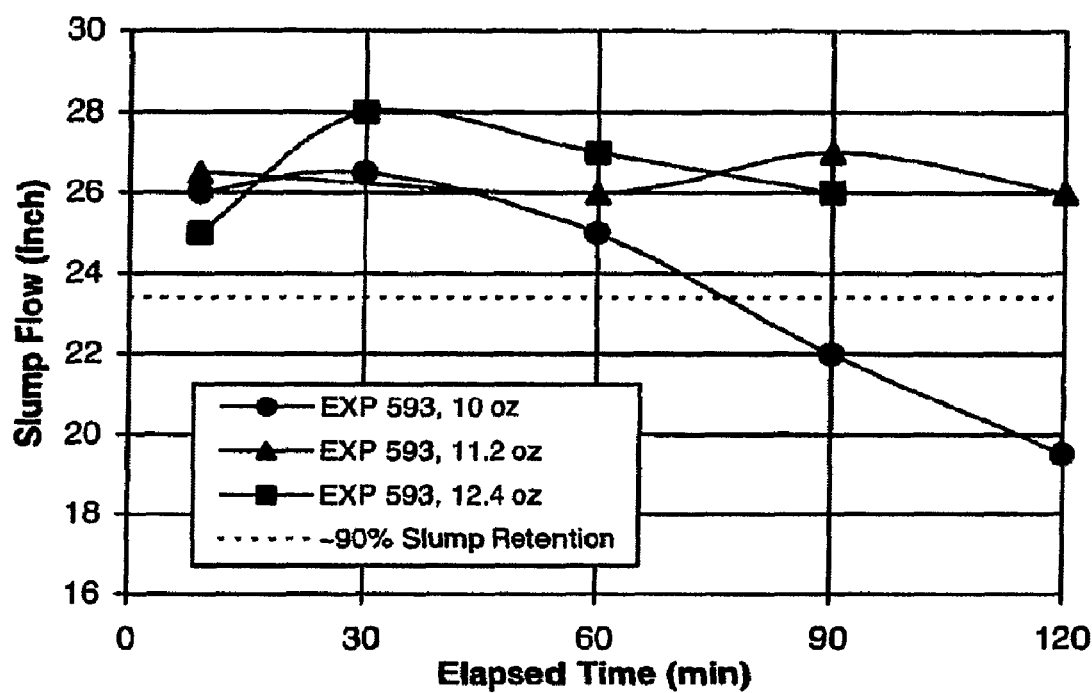
FIG. 5 is a graphic illustration of increase in slump or workability retention as a function of dosage rate, using an exemplary VDVSS of the present invention at three different dosages.

An exemplary admixture of the invention was made using a viscosity-modifying agent, formula Exp 593. FIG. 5 illustrates the increase in slump or workability retention as a function of dosage rate. The concrete mixture includes 600 lbs/cubic yard (cy) of Portland cement and 150 lbs/cy of fly ash. Three identical concrete mixtures were treated with the invented admixture at three different dosages.

Figure 6:
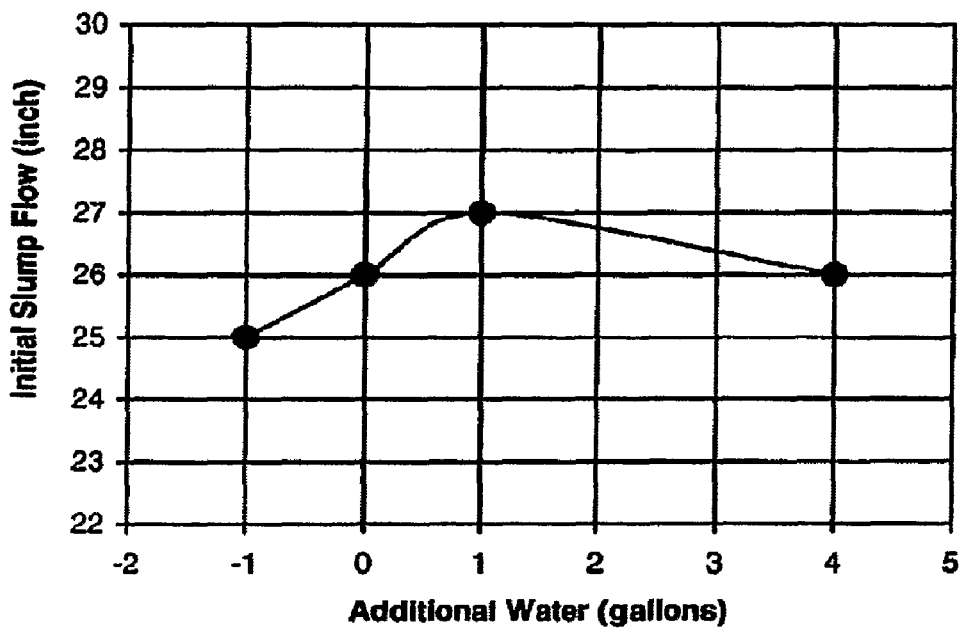
FIG. 6 is a graphic illustration of slump performance of a concrete mix containing additional water.

In FIG. 6, concrete slump-flow as a function of variable water containing concrete mixes is shown. The slump flow retention is shown to remain quite consistent despite a variation of five (5) gallons of water/cy to the mixture. It is not uncommon for repeated production batches of concrete to have this level of batch-to-batch water variation. Without use of the inventive admixture, the variation in slump-flow would at least be double that of the two-inch (2″) inch range shown in FIG. 6, which would be acceptable for assuring concrete quality.

Figure 7:
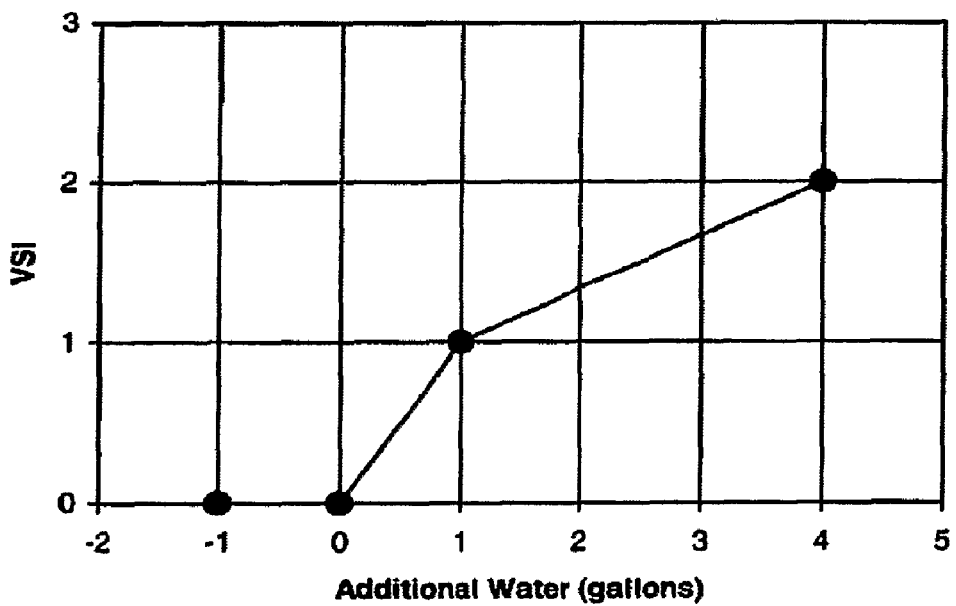
FIG. 7 is a graphic illustration of concrete into which water is added.

In FIG. 7, the stability of the concrete mixture, as indicated by a visual examination, which in turn produces a Visual Stability Index (VSI), indicates relatively uniform concrete composition is maintained despite the addition of water. VSI values less than 2 indicate that the concrete mixture has acceptable segregation resistance, or may possibly need a slight adjustment of mixture proportions. The VSI test is described in ASTM standard 1611.

The foregoing exemplary embodiments are provided for illustrative purposes only, and are not intended to limit the scope of the invention.

We claim:

1. A method for achieving slump retention in a hydratable cementitious composition over time without significantly changing the initial workability of the composition, comprising adding an additive comprising (a) an initial slump increasing agent (b) a moderating agent that moderates the response of said initial increasing agent when both are added to the cementitious composition, and (c) a long term slump retention agent.

2. The method of claim 1 wherein said initial slump increasing agent comprises a polycarboxylate comb polymer superplasticizer having pendant ionized cement anchoring groups and pendant non-ionizable dispersing groups.

3. The method of claim 1 wherein said moderating agent is selected from the group comprising melamine sulfonate formaldehyde condensate, naphthalene sulfonate formaldehyde condensate, lignosulfonates, and sulfonate, carbonate, phosphate, formate, nitrite, and nitrate salts.

4. The method of claim 1 wherein said long term slump retention agent comprises a polycarboxylate comb polymer superplasticizer having less initially ionized cement anchoring groups than said initial slump increasing agent or initially-non-ionized cement anchoring groups which become ionized over time and pendant non-ionizable dispersing groups.

5. An admixture composition designed to achieve slump retention of a cementitious composition over time without significantly changing its workability,
 (iv) a first component operative to increase initial slump of the composition, said first component comprising a polycarboxylate comb polymer superplasticizer having pendant ionized cement anchoring groups and having pendant non-ionizable dispersing groups, wherein the ratio of said ionized cement anchoring groups is 1:1 to 20:1 with respect to said non-ionizable dispersing groups;
 (v) a second component operative to moderate the slump-increasing effect of said first component, selected from the group consisting of melamine sulfonate formaldehyde condensate, naphthalene sulfonate formaldehyde condensate, a lignosulfonate, a sulfonate, a carbonate, a gluconate, a phosphate, and a viscosity modifying agent, and mixtures thereof; and
 (vi) a long term slump retaining agent comprising a polycarboxylate comb polymer superplasticizer having pendant initially-non-ionized cement anchoring groups, which become ionized over time after being mixed into the wet cementitious mixture, and pendant non-ionizable dispersing groups, wherein the ratio of said initially non-ionized cement anchoring groups is 1:1 to 20:1 with respect to said non-ionizable dispersing groups.

6. A method of extending the slump of a cementitious composition without significantly affecting its setting time comprising adding to said composition a slump extending amount of a comb polycarboxylate superplasticizer that does not affect the initial slump of the composition, yet acts to maintain slump even with increased dosage of said comb polycarboxylate superplasticizer.

7. The method of claim 1 wherein a viscosity modifying agent is used as component (b).

8. The method of claim 7 wherein said viscosity modifying agent is a biopolymer polysaccharide.

* * * * *